(12) United States Patent
Feng

(10) Patent No.: US 11,051,264 B2
(45) Date of Patent: Jun. 29, 2021

(54) SYNCHRONIZATION METHOD, SYNCHRONIZATION DEVICE AND SYNCHRONIZATION SOURCE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/066,176

(22) PCT Filed: Mar. 29, 2016

(86) PCT No.: PCT/CN2016/077659
§ 371 (c)(1),
(2) Date: Jun. 26, 2018

(87) PCT Pub. No.: WO2017/166045
PCT Pub. Date: Oct. 5, 2017

(65) Prior Publication Data
US 2019/0007918 A1    Jan. 3, 2019

(51) Int. Cl.
*H04W 56/00* (2009.01)
*H04W 76/10* (2018.01)
*H04W 88/06* (2009.01)

(52) U.S. Cl.
CPC ....... *H04W 56/0015* (2013.01); *H04W 56/00* (2013.01); *H04W 76/10* (2018.02); *H04W 88/06* (2013.01)

(58) Field of Classification Search
CPC . H04W 56/0015; H04W 76/10; H04W 56/00; H04W 88/06
See application file for complete search history.

(56) References Cited

U.S. PATENT DOCUMENTS

| | | | |
|---|---|---|---|
| 8,213,405 B2 | 7/2012 | Horn | |
| 2007/0037548 A1* | 2/2007 | Sammour | H04W 52/0235 455/343.2 |

(Continued)

FOREIGN PATENT DOCUMENTS

| | | |
|---|---|---|
| CN | 101983532 A | 3/2011 |
| CN | 102232274 A | 11/2011 |

(Continued)

OTHER PUBLICATIONS

International Search Report in international application No. PCT/CN2016/077659, dated Jan. 6, 2017.

(Continued)

*Primary Examiner* — Michael Thier
*Assistant Examiner* — Nevena Zecevic Sandhu
(74) *Attorney, Agent, or Firm* — Ladas & Parry LLP

(57) ABSTRACT

A synchronization method, synchronization device and synchronization source are provided. The synchronization method includes determining, by a synchronization device, multiple synchronization sources transmitting synchronization signals; when the synchronization sources include multiple first synchronization sources, the synchronization device determines whether manners in which all of the first synchronization sources select the synchronization signals are a same manner, and selects a target synchronization source from the multiple first synchronization sources based on whether the manners in which all of the first synchronization sources select the synchronization signals are the same manner; and the synchronization device synchronizes with the target synchronization source.

11 Claims, 5 Drawing Sheets

(56) References Cited

U.S. PATENT DOCUMENTS

| | | | |
|---|---|---|---|
| 2008/0181179 A1* | 7/2008 | Karaoguz | H04W 8/20 370/331 |
| 2009/0195277 A1 | 8/2009 | Horn | |
| 2010/0041388 A1* | 2/2010 | Kawasaki | H04W 88/06 455/422.1 |
| 2015/0154814 A1* | 6/2015 | Kalinadhabhotla | G07C 5/008 701/31.5 |
| 2015/0264588 A1 | 9/2015 | Li et al. | |
| 2015/0327195 A1 | 11/2015 | Chiu | |
| 2015/0327201 A1 | 11/2015 | He et al. | |
| 2016/0212594 A1 | 7/2016 | Morita et al. | |
| 2016/0309306 A1 | 10/2016 | Morita et al. | |
| 2017/0071021 A1* | 3/2017 | Jin | H04W 76/27 |
| 2017/0156122 A1* | 6/2017 | Lu | H04W 4/06 |
| 2018/0070217 A1 | 3/2018 | Morita et al. | |
| 2018/0255525 A1* | 9/2018 | Uchiyama | H04W 56/0015 |

FOREIGN PATENT DOCUMENTS

| | | |
|---|---|---|
| CN | 104735774 A | 6/2015 |
| CN | 104754740 A | 7/2015 |
| CN | 104812050 A | 7/2015 |
| CN | 105101391 A | 11/2015 |
| CN | 105101394 A | 11/2015 |
| CN | 105281884 A | 1/2016 |
| JP | 2011514716 A | 5/2011 |
| JP | 2012531871 A | 12/2012 |
| JP | 2017510191 A | 4/2017 |
| JP | 2018525894 A | 9/2018 |
| KR | 20130029355 A | 3/2013 |
| WO | 2009099809 A2 | 8/2009 |
| WO | 2011000216 A1 | 1/2011 |
| WO | 2015046264 A1 | 4/2015 |
| WO | 2015137781 A1 | 9/2015 |
| WO | 2015143751 A1 | 10/2015 |
| WO | 2017007285 A1 | 1/2017 |

OTHER PUBLICATIONS

The Written Opinion of the International Search Authority in international application No. PCT/CN2016/077659, dated Jan. 6, 2017.
Supplementary European Search Report in the European application No. 16895826.2, dated Jun. 13, 2019.
Huawei, HiSilicon, Synchronization procedure and synchronization source priority for V2V [online], 3GPP RAN WG1#84 R1-160306, Feb. 6, 2016, pp. 4-5.
Intel Corporation, Sidelink Synchronization Enhancements for V2V Communication [online], 3GPP RAN WG1#84 R1-160702, Feb. 6, 2016, p. 3.
LG Electronics, Discussion on synchronization enhancement for PC5-based V2V [online], 3GPP RAN WG1#83 R1-156895, Jan. 1, 2015.
First Office Action of Japanese application No. 2018-535869, dated Dec. 24, 2019.
First Office Action, of the chinese apptinaton No. 201680074856.0, dated Jun. 30, 2020.
Office Action of the Indian application No. 201817030711, dated Jun. 29, 2020.
Notice of Allowance of the Japanese application No. 2016-535869, dated Aug. 4, 2020.
Written Opinion of the International Search Authority in the international apptication No. PCT/CN2016/077659, dated Jan. 6, 2017.
Second Office Action or the Chinese application No. 201680074856.0, dated Sep. 2, 2020.
First Office Action of the Taiwanese application No. 106110453, dated Oct. 12, 2020.
Third Office Action of the Chinese application No. 201680074856.0, dated Dec. 23, 2020.

* cited by examiner

SYNCHRONIZATION METHOD, SYNCHRONIZATION DEVICE AND SYNCHRONIZATION SOURCE

RELATED APPLICATION

This application is an application under 35 U.S. 371 of international Application No. PCT/CN2016/077659 filed on Mar. 29, 2016, the entire contents of which are incorporated herein by reference.

TECHNICAL FIELD

The disclosure relates to the field of communications, and more particularly to a synchronization method, a synchronization device and a synchronization source.

BACKGROUND

In 3rd Generation Partnership Project (3GPP) Release-12&13, equipment utilizes synchronization of a cellular network to implement synchronization for Device to Device (D2D) communication. For a scenario without coverage of a cellular network, equipment located on an edge of the cellular network may help equipment out of the coverage of the network implement synchronization by transmitting synchronization signals to the surrounding.

Along with introduction of a satellite system into D2D communication, how to implement synchronization is a problem urgent to be solved.

SUMMARY

Embodiments of the application provide a synchronization method, a synchronization device and a synchronization source, which may achieve compatibility with a satellite system and a cellular network and implement synchronization of a synchronization device.

A first aspect provides a synchronization method, which may include that: a synchronization device determines at least one synchronization source for sending a synchronization signal; when the at least one synchronization source includes at least one first synchronization source, the synchronization device selects a target synchronization source from the at least one first synchronization source based on a manner in which each first synchronization source selects the synchronization signal, wherein the manner in which the first synchronization source selects the synchronization signal may include a first manner and a second manner, the first manner may be selecting the synchronization signal according to a first priority order, and the second manner may be selecting the synchronization signal according to a second priority order, wherein the first priority order may be an order of synchronization signals sequenced according to relevance between synchronization signals and a cellular network, and the second priority order may be an order of synchronization signals sequenced according to relevance between synchronization signals and a satellite system; and the synchronization device performs synchronization with the target synchronization source.

In combination with the first aspect, in a first possible implementation mode of the first aspect, the first priority order may include: a synchronization signal directly from network equipment, a synchronization signal from terminal equipment directly synchronized with the network equipment, and a synchronization signal from terminal equipment indirectly synchronized with the network equipment in order from high to low.

In combination with the first aspect or any abovementioned possible implementation mode thereof, in a second possible implementation mode of the first aspect, the second priority order may include: a synchronization signal directly from the satellite system, a synchronization signal from terminal equipment directly synchronized with the satellite system, and a synchronization signal from terminal equipment indirectly synchronized with the satellite system in order from high to low.

In combination with the first aspect or any abovementioned possible implementation mode thereof in a third possible implementation mode of the first aspect, a first synchronization sequence may include the synchronization signal from the terminal equipment directly synchronized with the satellite system, wherein the first synchronization sequence may further be configured to indicate that terminal equipment for sending the first synchronization sequence is directly synchronized with the satellite system, or, the terminal equipment for sending the first synchronization sequence may indicate through a broadcast signal that it is directly synchronized with the satellite system; and/or, a second synchronization sequence may include the synchronization signal from the terminal equipment indirectly synchronized with the satellite system, wherein the second synchronization sequence may further be configured to indicate that terminal equipment for sending the second synchronization sequence is indirectly synchronized with the satellite system, or, the terminal equipment for sending the second synchronization sequence may indicate through a broadcast signal that it is indirectly synchronized with the satellite system.

In combination with the first aspect or any abovementioned possible implementation mode thereof, in a fourth possible implementation mode of the first aspect, when the synchronization device is out of coverage of the cellular network and may receive a satellite signal, the operation that the synchronization device selects the target synchronization source from the at least one first synchronization source may include that: whether the manner in which the at least one first synchronization source selects the synchronization signal is the same or not is determined; and the target synchronization source is selected from the at least one first synchronization source according to whether the manner in which the at least one first synchronization source selects the synchronization signal is the same or not.

In combination with the first aspect or any abovementioned possible implementation mode thereof, in a fifth possible implementation mode of the first aspect, when the synchronization device is out of the coverage of the cellular network and may receive the satellite signal, if the manner in which each first synchronization source selects the synchronization signal is the same, the synchronization device may select the target synchronization source according to a third priority order, wherein the third priority order may include: a synchronization source synchronized with both of the cellular network and the satellite system, a synchronization source synchronized with the satellite system, and a synchronization source synchronized with the network equipment in order from high to low.

In combination with the first aspect or any abovementioned possible implementation mode thereof, in a sixth possible implementation mode of the first aspect, when the synchronization device is out of the coverage of the cellular network and may receive the satellite signal, if the manner in which the at least one first synchronization source selects the synchronization signal is different, the synchronization device may select the target synchronization source according to a fourth priority order, wherein the fourth priority order may include: a synchronization source selecting the synchronization signal according to the first manner and synchronized with both of the network equipment and the satellite system, a synchronization source selecting the synchronization signal according to the second manner and synchronized with both of the network equipment and the satellite system, a synchronization source selecting the synchronization signal according to the second manner and synchronized with the satellite system, and a synchronization source selecting the synchronization signal according to the first manner and synchronized with the network equipment in order from high to low.

In combination with the first aspect or any abovementioned possible implementation mode thereof in a seventh possible implementation mode of the first aspect, signal strength of the first synchronization source may be higher than or equal to a first threshold value.

In combination with the first aspect or any abovementioned possible implementation mode thereof, in an eighth possible implementation mode of the first aspect, when the at least one synchronization source does not include the first synchronization source, the synchronization device may be synchronized with the satellite system.

In combination with the first aspect or any abovementioned possible implementation mode thereof, in a ninth possible implementation mode of the first aspect, when the synchronization device is out of the coverage of the cellular network and may not receive any satellite signal, the operation that the synchronization device selects the target synchronization source from the at least one first synchronization source may include that: whether the manner in which the at least one first synchronization signal selects the synchronization signal is the same or not is determined; and the target synchronization source is selected from the at least one first synchronization source according to whether the manner in which the at least one first synchronization source selects the synchronization signal is the same or not.

In combination with the first aspect or any abovementioned possible implementation mode thereof, in a tenth possible implementation mode of the first aspect, when the synchronization device is out, of the coverage of the cellular network and may not receive any satellite signal, if the manner in which the at least one first synchronization source selects the synchronization signal is the same, the synchronization device may select the target synchronization source according to a fifth priority order, wherein the fifth priority order may include: a synchronization source synchronized with both of the network equipment and the satellite system, the synchronization source synchronized with the network equipment, and the synchronization source synchronized with the satellite system in order from high to low.

In combination with the first aspect or any abovementioned possible implementation mode thereof, in an eleventh possible implementation mode of the first aspect, when the synchronization device is out of the coverage of the cellular network and may not receive any satellite signal, if the manner in which the at least one first synchronization source selects the synchronization signal is different, the synchronization device may select the target synchronization source according to a sixth priority order, wherein the sixth priority order may include: the synchronization source selecting the synchronization signal according to the first manner and synchronized with both of the network equipment and the satellite system, the synchronization source selecting the synchronization signal according to the first manner and synchronized with the network equipment, the synchronization source selecting the synchronization signal according to the second manner and synchronized with both of the network equipment and the satellite system, and the synchronization source selecting the synchronization signal according to the second manner and synchronized with the satellite system in order from high to low.

In combination with the first aspect or any abovementioned possible implementation mode thereof, in a twelfth possible implementation mode of the first aspect, the signal strength of the first synchronization source may be higher than or equal to a second threshold value.

In combination with the first aspect or any abovementioned possible implementation mode thereof, in a thirteenth possible implementation mode of the first aspect, when the synchronization device is out of the coverage of the cellular network and may not receive any satellite signal, if the at least one synchronization source does not include the first synchronization source and includes at least one second synchronization source, the synchronization device may select the target synchronization source according to a seventh priority order, and signal strength of the second synchronization source may be lower than the second threshold value and higher than or equal to a third threshold value, wherein the seventh priority order may include: the synchronization source synchronized with the satellite system, and a synchronization source not synchronized with the satellite system and the network equipment in order from high to low.

In combination with the first aspect or any abovementioned possible implementation mode thereof, in a fourteenth possible implementation mode of the first aspect, the satellite system may be a Global Navigation Satellite System (GNSS), and the synchronization device may be vehicle-mounted equipment.

In combination with the first aspect or any abovementioned possible implementation mode thereof, in a fifteenth possible implementation mode of the first aspect, the at least one synchronization source may include at least one of the network equipment, the terminal equipment and the satellite system.

A second aspect provides a synchronization method, which may include that: a synchronization device receives indication information sent by network equipment, wherein the indication information may be configured to indicate a manner in which the synchronization device selects a synchronization source, the manner may be a first manner or a second manner or a third manner, the first manner may be selecting a synchronization signal according to a first priority order, the second manner may be selecting the synchronization signal according to a second priority order, and the third manner may be selecting the synchronization signal according to the first priority order and the second priority order, wherein the first priority order may be an order of synchronization signals sequenced according to relevance between synchronization signals and a cellular network, and the second priority order may be an order of synchronization signals sequenced according to relevance between synchronization signals and a satellite system; and the synchronization device selects a target synchronization source based on the indication information.

In combination with the second aspect, in a first possible implementation mode of the second aspect, the operation that the synchronization device selects the target synchronization source based on the indication information may include that: when the indication information indicates the first manner, if the synchronization device may not receive any synchronization signal related to a signal of the cellular network, the synchronization device selects the target synchronization source according to the second manner; or when the indication information indicates the second manner, if the synchronization device may not receive any synchronization signal related to the satellite system, the synchronization device selects the target synchronization source according to the first manner.

In combination with the second aspect or any abovementioned possible implementation mode thereof, in a second possible implementation mode of the second aspect, if the synchronization device may not receive any synchronization signal related to the signal of the cellular network within a first predetermined time, the synchronization device may select the target synchronization source according to the second manner; or, if the synchronization device may not receive any synchronization signal related to the satellite system within a second predetermined time, the synchronization device may select the target synchronization source according to the first manner.

In combination with the second aspect or any abovementioned possible implementation mode thereof, in a third possible implementation mode of the second aspect, the first priority order may include: a synchronization signal directly from network equipment, a synchronization signal from terminal equipment directly synchronized with the network equipment, and a synchronization signal from terminal equipment indirectly synchronized with the network equipment in order from high to low.

In combination with the second aspect or any abovementioned possible implementation mode thereof, in a fourth possible implementation mode of the second aspect, the second priority order may include: a synchronization signal generated by the satellite system, a synchronization signal from terminal equipment directly synchronized with the satellite system, and a synchronization signal from terminal equipment indirectly synchronized with the satellite system in order from high to low.

In combination with the second aspect or any abovementioned possible implementation mode thereof, in a fifth possible implementation mode of the second aspect, in the third manner, priorities of the synchronization signals in the first priority order may be higher than priorities of the synchronization signals in the second priority order, or the priorities of the synchronization signals in the second priority order may be higher than the priorities of the synchronization signals in the first priority order.

A third aspect provides a synchronization method, which may include that: a synchronization source determines a manner configured to acquire a synchronization signal, wherein the manner in which the synchronization source acquires the synchronization signal may include a first manner or a second manner, the first manner may be selecting the synchronization signal according to a first priority order, and the second manner may be selecting the synchronization signal according to a second priority order, wherein the first priority order may be an order of synchronization signals sequenced according to relevance between synchronization signals and a cellular network, and the second priority order may be an order of synchronization signals sequenced according to relevance between synchronization signals and a satellite system; the synchronization source acquires a first synchronization signal according to the determined manner configured to acquire the synchronization signal; the synchronization source performs synchronization according to the first synchronization signal; and the synchronization source sends a second synchronization signal and indication information, wherein the indication information may be configured to indicate the manner in which the synchronization source acquires the first synchronization signal.

In combination with the third aspect, in a first possible implementation mode of the third aspect, the operation that the synchronization source sends the synchronization signal and the indication information may include that: the second synchronization signal implemented through a first synchronization sequence is sent; and broadcast information is sent, the broadcast information being configured to indicate the indication information.

In combination with the third aspect or any abovementioned possible implementation mode thereof in a second possible implementation mode of the third aspect, the synchronization source may be equipment directly synchronized with the satellite system, and the first synchronization sequence may be a sequence including the second synchronization signal sent by the synchronization source, or, the synchronization source may be equipment indirectly synchronized with the satellite system, and the first synchronization sequence may be a sequence including the second synchronization signal sent by the synchronization source.

In combination with the third aspect or any abovementioned possible implementation mode thereof, in a third possible implementation mode of the third aspect, the operation that the synchronization source sends the synchronization signal and the indication information may include that: a second synchronization sequence is sent, the second synchronization sequence including the second synchronization signal and the indication information.

In combination with the third aspect or any abovementioned possible implementation mode thereof, in a fourth possible implementation mode of the third aspect, the synchronization source may be equipment directly synchronized with the satellite system, and the second synchronization sequence may be a sequence including the second synchronization signal sent by the synchronization source; or, the synchronization source may be equipment indirectly synchronized with the satellite system, and the second synchronization sequence may be a sequence including the second synchronization signal sent by the synchronization source.

In combination with the third aspect or any abovementioned possible implementation mode thereof, in a fifth possible implementation mode, the first priority order may include: a synchronization signal directly from network equipment, a synchronization signal from terminal equipment directly synchronized with the network equipment, and a synchronization signal from terminal equipment indirectly synchronized with the satellite system in order from high to low.

In combination with the third aspect or any abovementioned possible implementation mode thereof, in a sixth possible implementation mode of the third aspect, the second priority order may include: a synchronization signal generated by the satellite system, a synchronization signal from terminal equipment directly synchronized with the satellite system, and a synchronization signal from terminal equipment indirectly synchronized with the satellite system in order from high to low.

In combination with the third aspect or any abovementioned possible implementation mode thereof, in a seventh possible implementation mode of the third aspect, the operation that the synchronization source determines the manner configured to acquire the synchronization signal may include that: the synchronization source determines the manner configured to acquire the synchronization signal according to indication of the network equipment.

A third aspect provides a terminal, which is configured to execute the method in the first aspect or any optional implementation mode of the first aspect. Specifically, the communication equipment includes module units configured to execute the method in the first aspect or any optional implementation mode of the first aspect.

A fourth aspect provides a synchronization device, which is configured to execute the method in the first aspect or any optional implementation mode of the first aspect. Specifically, the synchronization device includes module units configured to execute the method in the first aspect or any optional implementation mode of the first aspect.

A fifth aspect provides a synchronization device, which is configured to execute the method in the second aspect or any optional implementation mode of the second aspect. Specifically, the synchronization device includes module units configured to execute the method in the second aspect or any optional implementation mode of the second aspect.

A sixth aspect provides a synchronization source, which is configured to execute the method in the third aspect or any optional implementation mode of the third aspect. Specifically, the synchronization source includes module units configured to execute the method in the third aspect or any optional implementation mode of the third aspect.

A seventh aspect provides a synchronization device, which includes a memory and a processor, wherein the memory is configured to store instructions, the processor is configured to execute the instructions stored in the memory, and when the processor executes the instruction stored in the memory, such execution enables the processor to execute the method in the first aspect or any optional implementation mode of the first aspect.

An eighth aspect provides a synchronization device, which includes a memory and a processor, wherein the memory is configured to store instructions, the processor is configured to execute the instructions stored in the memory, and when the processor executes the instructions stored in the memory, such execution enables the processor to execute the method in the second aspect or any optional implementation mode of the second aspect.

A ninth aspect provides a synchronization source, which includes a memory and a processor, wherein the memory is configured to store instructions, the processor is configured to execute the instructions stored in the memory, and when the processor executes the instructions stored in the memory, such execution enables the processor to execute the method in the third aspect or any optional implementation mode of the third aspect.

A tenth aspect provides a computer storage medium, in which a program code is stored, wherein the program code is configured to indicate the method in the first aspect or any optional implementation mode of the first aspect to be executed.

An eleventh aspect provides a computer storage medium, in which a program code is stored, wherein the program code is configured to indicate the method in the second aspect or any optional implementation mode of the second aspect to be executed.

A twelfth aspect provides a computer storage medium, in which a program code is stored, wherein the program code is configured to indicate the method in the third aspect or any optional implementation mode of the third aspect to be executed.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art based on the embodiments in the disclosure without creative work shall fall within the scope of protection of the disclosure.

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced LTE (LTE-A) system, a Universal Mobile Telecommunication System (UMTS) and 5th-Generation (5G).

In some embodiments, D2D communication may refer to Vehicle to Vehicle (V2V) communication or Vehicle to X (V2X) communication. In V2X communication, X may generally refer to any piece of equipment with a wireless receiving and sending capability, for example, but not limited to, a wireless device moving at a low speed, vehicle-mounted equipment moving at a high speed or a network control node with a wireless transmitting and receiving capability. Of course, the embodiments of the application may be applied not to D2D communication but to communication between a terminal and a cellular network.

In the embodiments of the disclosure, network equipment may be a Base Transceiver Station (BTS) in the GSM or CDMA, may also be aNodeB in WCDMA, may further be an Evolved Node B (eNB or e-NodeB) in LTE, and may further be equipment configured to provide access service in 5G, which will not be limited in the embodiments of the disclosure.

In the embodiments of the disclosure, a satellite system may be a GNSS.

Figure 1:
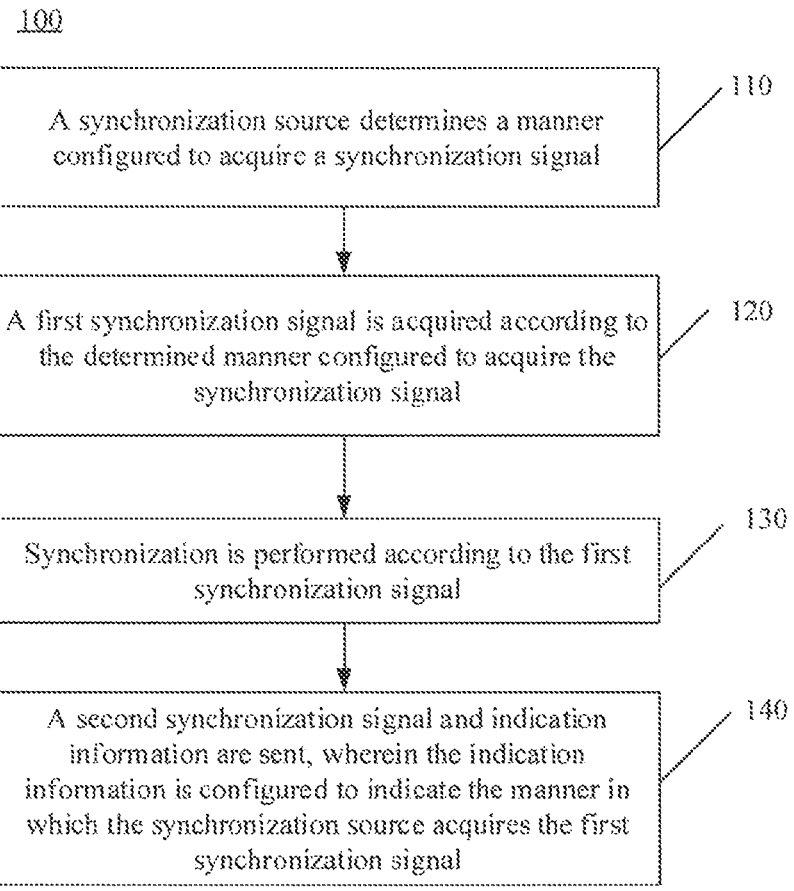
FIG. 1 is a schematic flowchart of a synchronization method according to an embodiment of the application.

FIG. 1 is a schematic flowchart, of a synchronization method 100 according to an embodiment of the application. The method may be implemented by a synchronization source #1.

In 110, a synchronization source determines a manner configured to acquire a synchronization signal.

Herein, the manner in which the synchronization source selects the synchronization signal includes a first manner or a second manner, the first manner is to select the synchronization signal according to a first priority order, and the second manner is to select the synchronization signal according to a second priority order, wherein the first priority order is an order of synchronization signals sequenced according to relevance between synchronization signals and a signal of a cellular network, and the second priority order is an order of synchronization signals sequenced according to relevance between synchronization signals and a satellite signal.

Optionally, the first priority order includes: a synchronization signal directly from network equipment, a synchronization signal from equipment directly synchronized with the network equipment, a synchronization signal from equipment indirectly synchronized with the network equipment, wherein the equipment indirectly synchronized with the network equipment refers to equipment capable of indirectly obtaining a synchronization signal of the network equipment, for example, a synchronization signal provided by equipment on an edge of the network, the synchronization signal provided by the equipment on the edge of the network being based on a synchronization signal directly received from the network equipment.

In the first priority order, a synchronization signal directly obtained from the cellular network has a higher priority. This is because, every time when the synchronization signal is forwarded, a certain error may be accumulated, and if it is forwarded for more times, the accumulated synchronization error is greater and synchronization accuracy is lower. Therefore, the synchronization signal directly obtained from the cellular network has the higher priority.

Optionally, the second priority order includes: a satellite signal, a synchronization signal from equipment directly synchronized with a satellite system, and a synchronization signal from equipment indirectly synchronized with the satellite system in order from high to low.

Herein, the equipment indirectly synchronized with the satellite system refers to that the synchronization source may not be directly synchronized with the satellite system and acquires a synchronization signal sent by equipment directly synchronized with the satellite signal.

In the second priority order, a synchronization signal directly obtained from the satellite system has a higher priority. This is because, every time when the synchronization signal is forwarded, a certain error may be accumulated, and if it is forwarded for more times, the accumulated synchronization error is greater and the synchronization accuracy is lower. Therefore, the synchronization signal directly obtained from the satellite system has the higher priority.

Optionally, the synchronization source may determine the manner configured to acquire the synchronization signal according to indication of the network equipment.

In 120, a first synchronization signal is acquired according to the determined manner configured to acquire the synchronization signal.

In 130, synchronization is performed according to the first synchronization signal.

In 140, a second synchronization signal and indication information are sent, wherein the indication information is configured to indicate the manner in which the synchronization source acquires the first synchronization signal.

Optionally, the synchronization source #1 may send a first synchronization sequence and a broadcast message, the first synchronization sequence includes the second synchronization signal, and the broadcast message is configured to indicate the indication information. Optionally, the first synchronization sequence may be the same as a second synchronization sequence.

That is, the synchronization sequence only contains the synchronization signal and indication about the manner in which the synchronization source #1 selects the synchronization signal may be sent through the broadcast message. For example, the broadcast message is sent through a synchronous broadcast channel.

Optionally, the synchronization source #1 may send the second synchronization sequence, and the second synchronization sequence includes the second synchronization signal and the indication information.

That is, the synchronization sequence may not only be configured to contain the synchronization signal but also be configured to indicate the manner in which the synchronization source selects the synchronization signal.

The synchronization sequence mentioned in the embodiment of the application may include the following four sequences: a synchronization sequence configured to synchronize a synchronization device with the cellular network and the satellite system; a synchronization sequence configured to synchronize the synchronization device with not the satellite system but the cellular network; a synchronization sequence configured to synchronize the synchronization device with not the cellular network but the satellite signal; and a synchronization sequence sent by the synchronization source (the synchronization source is neither synchronized with the cellular network nor synchronized with the satellite system).

In the embodiment of the application, the synchronization sequence may indicate whether the synchronization source is synchronized with the cellular network and/or the satellite system or not.

The synchronization sequence mentioned in the embodiment of the application may also include the following two sequences: a sequence including a synchronization signal from equipment directly synchronized with the satellite system; and a sequence including a synchronization signal from equipment indirectly synchronized with the satellite system.

Optionally, in the embodiment of the application, the synchronization sequence may contain the synchronization signal only.

Optionally, the synchronization sequence may not only contain the synchronization signal but also indicate whether the synchronization source for sending the synchronization signal is directly or indirectly synchronized with the cellular network and/or the satellite system or not, namely whether the synchronization device may implement direct or indirect synchronization with the cellular network and/or the satellite system by virtue of the synchronization signal or not.

Optionally, in the embodiment of the application, a broadcast signal may also be directly sent, and whether the synchronization source for sending the synchronization signal is directly or indirectly synchronized with the cellular network and/or the satellite system or not, namely whether the synchronization device may be directly or indirectly synchronized with the cellular network and/or the satellite system by virtue of the synchronization signal or not, is indicated through the broadcast signal.

Optionally, in the embodiment of the application, that the equipment is synchronized with the cellular network and also synchronized with the satellite system refers to that the network equipment in the cellular network is synchronized with the satellite system.

Optionally, in the embodiment of the application, besides the synchronization signal sent according to the method 100, there are also other sources for the synchronization signal.

For example, network equipment #2 may also send a synchronization signal, and when the network equipment sends the synchronization signal, indication about a manner in which the network equipment selects the synchronization signal is not sent.

For example, when terminal equipment #3 does not find any external synchronization source but may be directly synchronized with the satellite system, at this time, the terminal equipment #3 is out of coverage of the network equipment but may receive a satellite signal. Then, the terminal equipment is synchronized with the satellite system and sends a synchronization signal to indicate that it is synchronized with the satellite system but not synchronized with the cellular network. The terminal equipment does not send indication information about a manner in which it selects the synchronization signal.

For example, terminal equipment #4 does not find any external synchronization source and may not receive any satellite signal, at this time, the terminal equipment #4 is out of coverage of the cellular network and may not receive any satellite signal. Then, the terminal equipment generates a synchronization signal by itself to indicate that it is not synchronized with the cellular network and also not synchronized with the satellite system. The terminal equipment does not send indication information about a manner in which it selects the synchronization signal. Optionally, the synchronization source #1 may be terminal equipment, for example, vehicle-mounted equipment. The terminal equipment #3 and the terminal equipment #4 may be vehicle-mounted equipment.

How each synchronization source (including the synchronization source #1 implementing the method 100, the network equipment #2, the terminal equipment #3 and the terminal equipment #4) sends the synchronization signal has been described above, and how the synchronization device selects the synchronization source for synchronization after receiving the synchronization signal of the synchronization source will be described below, wherein the synchronization device may be vehicle-mounted equipment.

Optionally, a synchronization method 200 may be applied to the condition that the synchronization device is in the coverage of the cellular network or moves out of the coverage of the network after receiving the indication information of the network equipment within the coverage of the network. A synchronization method 300 may be applied to the condition that the synchronization device is out of the coverage of the cellular network.

Figure 2:
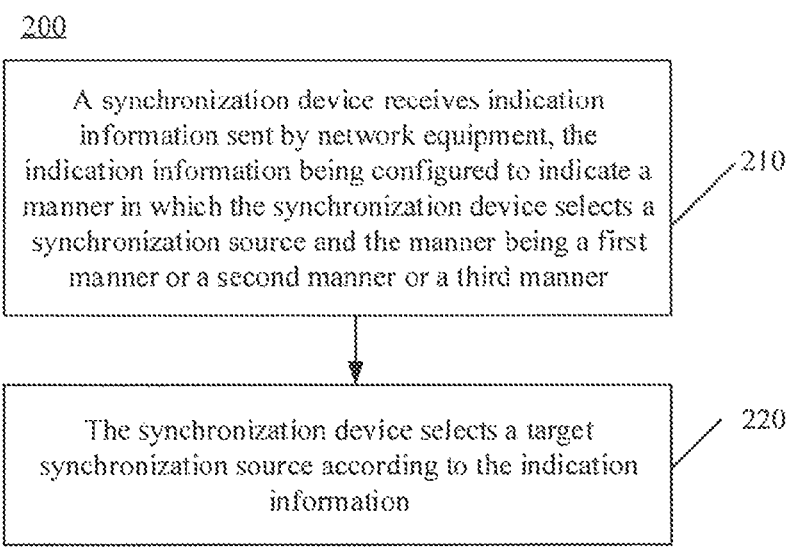
FIG. 2 is a schematic flowchart of a synchronization method according to an embodiment of the application.

FIG. 2 is a schematic flowchart of a synchronization method 200 according to an embodiment of the application.

In 210, a synchronization device receives indication information sent by network equipment, the indication information being configured to indicate a manner in which the synchronization device selects a synchronization source and the manner being a first manner or a second manner or a third manner.

Herein, the first manner is to select a synchronization signal according to a first priority order, the second manner is to select the synchronization signal according to a second priority order, and the third manner is to select the synchronization signal according to the first priority order and the second priority order, wherein the first priority order is an order of synchronization signals sequenced according to relevance between synchronization signals and a cellular network, and the second priority order is an order of synchronization signals sequenced according to relevance between synchronization signals and a satellite system.

In 220, the synchronization device selects a target synchronization source according to the indication information.

Optionally, when the indication information indicates the first manner, if the synchronization device may not receive any synchronization signal related to the cellular network, the synchronization device selects the target synchronization source according to the second manner.

Optionally, when the indication information indicates the second manner, if the synchronization device may not receive any synchronization signal related to the satellite system within a specified time period, the synchronization device selects the target synchronization source according to the first manner.

That is, when being in coverage of the cellular network, the synchronization device may be configured to select the target synchronization source for synchronization according to the first manner or the second manner. If the synchronization device is configured to select the target synchronization source by virtue of the first manner, if no synchronization signal related to the cellular network is received in a first predetermined time, the target synchronization source may be selected according to the second manner, and once the synchronization signal related to the cellular network is found, the target synchronization source is selected by adopting the first manner instead. If the synchronization device is configured to select the target synchronization source by virtue of the second manner, if no synchronization signal related to the satellite system is received within a second predetermined time, the target synchronization source may be selected according to the first manner, and once the synchronization signal related to the satellite system is received, the target synchronization source is selected by adopting the second manner instead.

Optionally, the first predetermined time may be equal or unequal to the second predetermined time.

Optionally, the first priority order includes: a synchronization signal directly from network equipment, a synchronization signal from terminal equipment directly synchronized with the network equipment, and a synchronization signal from terminal equipment indirectly synchronized with the network equipment in order from high to low.

In the first priority order, a synchronization signal directly obtained from the cellular network has a higher priority. This is because, every time when the synchronization signal is forwarded, a certain error may be accumulated, and if it is forwarded for more times, the accumulated synchronization error is greater and synchronization accuracy is lower.

Optionally, the second priority order includes: the satellite system, a synchronization signal from terminal equipment directly synchronized with the satellite system, and a synchronization signal from terminal equipment indirectly synchronized with the satellite system in order from high to low.

In the second priority order, a synchronization signal directly obtained from the satellite system has a higher priority. This is because, every time when the synchronization signal is forwarded, a certain error may be accumulated, and if it is forwarded for more times, the accumulated synchronization error is greater and the synchronization accuracy is lower. Therefore, the synchronization signal directly obtained from the satellite system has the higher priority.

Optionally, in the third manner, priorities of the synchronization signals in the first priority order are higher than priorities of the synchronization signals in the second priority order, for example, the synchronization signal directly from the network equipment, the synchronization signal from the terminal equipment directly synchronized with the network equipment, the synchronization signal from the terminal equipment indirectly synchronized with the network equipment, the synchronization signal directly from the satellite system, the synchronization signal from the terminal equipment directly synchronized with the satellite system, and the synchronization signal from the terminal equipment indirectly synchronized with the satellite system in order from high to low.

Optionally, in the third manner, the priorities of the synchronization signals in the second priority order are higher than the priorities of the synchronization signals in the first priority order, for example, the synchronization signal directly from the satellite system, the synchronization signal from the terminal equipment directly synchronized with the satellite system, the synchronization signal from the terminal equipment indirectly synchronized with the satellite system, the synchronization signal directly from the network equipment, the synchronization signal from the terminal equipment directly synchronized with the network equipment, and the synchronization signal from the terminal equipment indirectly synchronized with the network equipment in order from high to low.

Figure 3:
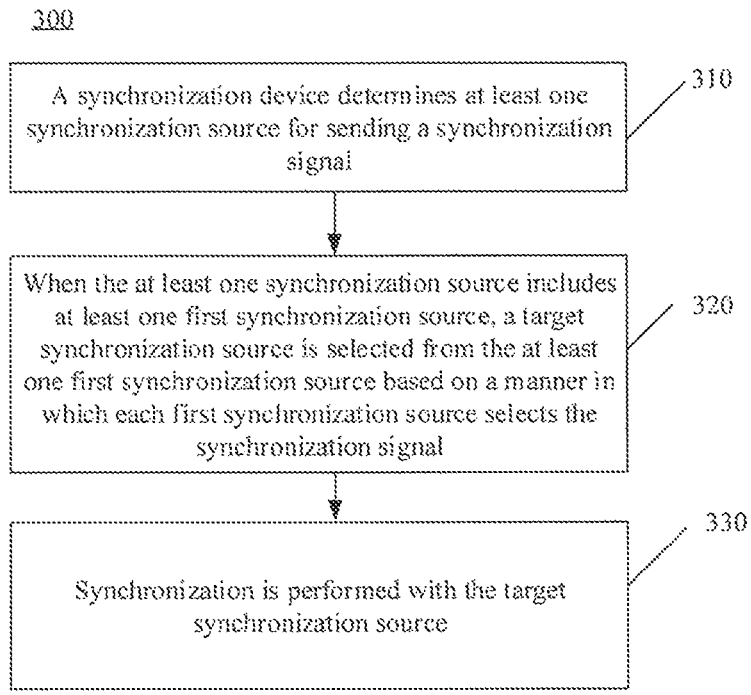
FIG. 3 is a schematic flowchart of a synchronization method according to an embodiment of the application.

FIG. 3 is a schematic flowchart, of a synchronization method 300 according to an embodiment of the application.

In 310, a synchronization device determines at least one synchronization source for sending a synchronization signal.

In 320, when the at least one synchronization source includes at least one first synchronization source, a target synchronization source is selected from the at least one first synchronization source based on a manner in which each first synchronization source selects the synchronization signal, wherein the manner in which the first synchronization source selects the synchronization signal includes a first manner or a second manner, the first manner is to select the synchronization signal according to a first priority order, and the second manner is to select the synchronization signal according to a second priority order, wherein the first priority order is an order of synchronization signals sequenced according to relevance between synchronization signals and a cellular network, and the second priority order is an order of synchronization signals sequenced according to relevance between synchronization signals and a satellite system.

In 330, synchronization with the target synchronization source is performed.

Optionally, the first priority order includes: a synchronization signal directly from network equipment, a synchronization signal from terminal equipment directly synchronized with the network equipment, and a synchronization signal from terminal equipment indirectly synchronized with the network equipment in order from high to low.

Optionally, the second priority order includes: a synchronization signal generated by the satellite system, a synchronization signal from terminal equipment directly synchronized with the satellite system, and a synchronization signal from terminal equipment indirectly synchronized with the satellite system from high to low.

Optionally, the synchronization device in the method 300 may be located in two communication scenarios. In the first communication scenario, the synchronization device is out of coverage of the cellular network but may receive a satellite signal sent by the satellite system. In the second communication scenario, the synchronization device is out of the coverage of the cellular network and may not receive the satellite signal sent by the satellite system. How to implement the synchronization method 300 will be described below in combination with the two scenarios in detail.

The First Communication Scenario

The synchronization device determines whether the manner in which the at least one first synchronization source selects the synchronization signal is the same or not; and the target synchronization source is selected from the at least one first synchronization source according to whether the manner in which the at least one first synchronization source selects the synchronization signal is the same or not.

For example, if the manner in which each first synchronization source selects the synchronization signal is the same, the synchronization device selects the target synchronization source according to a third priority order, wherein the third priority order includes: a synchronization source synchronized with both of the cellular network and the satellite system, a synchronization source synchronized with the satellite system, and a synchronization source synchronized with the network equipment in order from high to low.

In the third priority order, when the synchronization signal selected by each first synchronization source is the same, a priority of the synchronization source synchronized with both of the cellular network and the satellite system is highest, so that reducing interference to the cellular network and keeping synchronization out of the coverage of the cellular network may be combined. When the two may not be combined, preferably ensuring synchronization with the satellite system may keep synchronization out of the coverage of the cellular network, so that a priority of the synchronization source synchronized with the satellite system is higher than a priority of the synchronization source synchronized with the cellular network. For example, when the manner in which the at least one first synchronization source selects the synchronization signal is different, the synchronization device selects the target synchronization source according to a fourth priority order, wherein the fourth priority order includes: a synchronization source selecting the synchronization signal according to the first manner and synchronized with both of the network equipment and the satellite system, a synchronization source selecting the synchronization signal according to the second manner and synchronized with both of the network equipment and the satellite system, a synchronization source selecting the synchronization signal according to the second manner and synchronized with the satellite system, and a synchronization source selecting the synchronization signal according to the first manner and synchronized with the network equipment in order from high to low.

Optionally, signal strength of the first synchronization source is higher than or equal to a first threshold value. That is, not only is the first synchronization source required to select the synchronization signal according to the first manner or the second manner, but also the strength of the synchronization signal sent by it is required to be higher than the first threshold value. The first threshold value may be determined based on a practical condition.

Optionally, in synchronization sources of which provided synchronization signals may be received by the synchronization device, if selection of the synchronization sources according to the first manner or the second manner is not indicated, or the strength of all the provided synchronization signals is lower than the first threshold value, the synchronization device may be synchronized with the satellite system.

The Second Communication Scenario

The synchronization device determines whether the manner in which the at least one first synchronization signal selects the synchronization signal is the same or not; and the target synchronization source is selected from the at least one first synchronization source according to whether the manner in which the at least one first synchronization source selects the synchronization signal is the same or not.

For example, when the manner in which the at least one first synchronization source selects the synchronization signal is the same, the synchronization device selects the target synchronization source according to a fifth priority order, wherein the fifth priority order includes: a synchronization source synchronized with both of the network equipment and the satellite system, the synchronization source synchronized with the network equipment, and the synchronization source synchronized with the satellite system in order from high to low.

For example, when the manner in which the at least one first synchronization source selects the synchronization signal is different, the synchronization device selects the target synchronization source according to a sixth priority order, wherein the sixth priority order includes: the synchronization source selecting the synchronization signal according to the first manner and synchronized with both of the network equipment and the satellite system, the synchronization source selecting the synchronization signal according to the first manner and synchronized with the network equipment, the synchronization source selecting the synchronization signal according to the second manner and synchronized with both of the network equipment and the satellite system, and the synchronization source selecting the synchronization signal according to the second manner and synchronized with the satellite system in order from high to low.

Optionally, the signal strength of the first synchronization source is higher than or equal to a second threshold value. That is, not only is the first synchronization source required to select the synchronization signal according to the first manner or the second manner, but also the strength of the synchronization signal sent by it is required to be higher than the second threshold value. The second threshold value may be determined based on a practical condition.

Optionally, in the synchronization sources of which the provided synchronization signals may be received by the synchronization device, if selection of the synchronization sources according to the first manner or the second manner is not indicated, or the strength of all the provided synchronization signals is lower than the second threshold value, the synchronization device determine whether at least one second synchronization source exists in the synchronization sources of which the provided synchronization signals may be received or not, signal strength of the second synchronization source being lower than the second threshold value but higher than or equal to a third threshold value, and selects the target synchronization source according to a seventh priority order, wherein the seventh priority order includes:

the synchronization source synchronized with the satellite system and a synchronization source not synchronized with the satellite system and the network equipment in order from high to low.

Optionally, when the synchronization signals provided by the synchronization sources of which the provided synchronization signals may be received are all lower than the third threshold value, the synchronization device may send the synchronization signal by itself and set that it is not synchronized with both of the GNSS and the cellular network.

Figure 4:
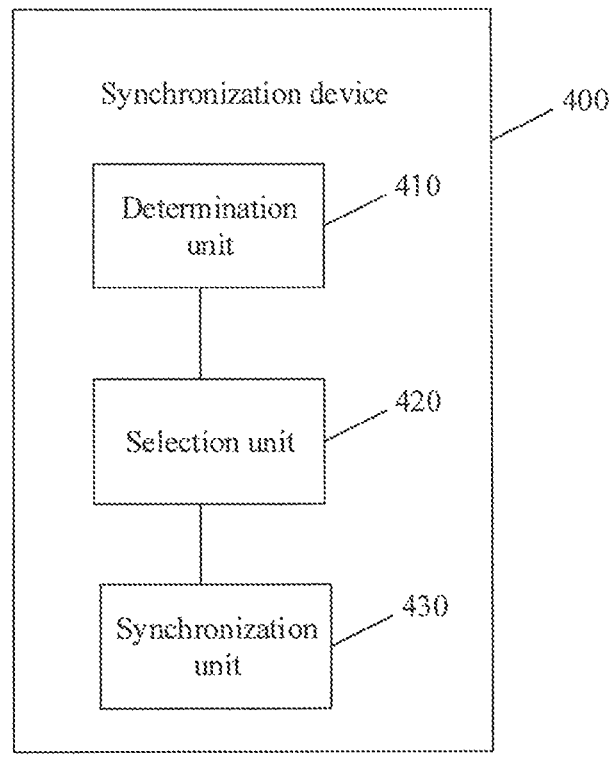
FIG. 4 is a schematic block diagram of a synchronization device according to an embodiment of the application.

FIG. 4 is a schematic block diagram of a synchronization device 400 according to an embodiment of the application. As shown in FIG. 4, the synchronization device 400 includes: a determination unit 410, configured to determine at least one synchronization source for sending a synchronization signal; a selection unit 420, configured to, when the at least one synchronization source includes at least one first synchronization source, select a target synchronization source from the at least one first synchronization source based on a manner in which each first synchronization source selects the synchronization signal, wherein the manner in which the first synchronization source selects the synchronization signal may include a first manner and a second manner, the first manner may be to select the synchronization signal according to a first priority order, and the second manner may be to select the synchronization signal according to a second priority order, wherein the first priority order may be an order of synchronization signals sequenced according to relevance between synchronization signals and a cellular network, and the second priority order may be an order of synchronization signals sequenced according to relevance between synchronization signals and a satellite system; and a synchronization unit 430, configured to perform synchronization with the target synchronization source.

Optionally, the first priority order includes: a synchronization signal directly from network equipment, a synchronization signal from terminal equipment directly synchronized with the network equipment, and a synchronization signal from terminal equipment indirectly synchronized with the network equipment in order from high to low.

Optionally, the second priority order includes: a synchronization signal directly from the satellite system, a synchronization signal from terminal equipment directly synchronized with the satellite system, and a synchronization signal from terminal equipment indirectly synchronized with the satellite system from high to low.

Optionally, a first synchronization sequence includes the synchronization signal from the terminal equipment directly synchronized with the satellite system, wherein the first synchronization sequence is further configured to indicate that terminal equipment for sending the first synchronization sequence is directly synchronized with the satellite system, or, the terminal equipment for sending the first synchronization sequence indicates through a broadcast signal that it is directly synchronized with the satellite system, and/or, a second synchronization sequence includes the synchronization signal from the terminal equipment indirectly synchronized with the satellite system, wherein the second synchronization sequence is further configured to indicate that terminal equipment for sending the second synchronization sequence is indirectly synchronized with the satellite system, or, the terminal equipment for sending the second synchronization sequence indicates through a broadcast signal that it is indirectly synchronized with the satellite system.

Optionally, when the synchronization device 400 is out of coverage of the cellular network and may receive a satellite signal, the selection unit 420 is specifically configured to determine whether the manner in which the at least one first synchronization source selects the synchronization signal is the same or not and select the target synchronization source from the at least one first synchronization source according to whether the manner in which the at least one first synchronization source selects the synchronization signal is the same or not.

Optionally, when the synchronization device 400 is out of the coverage of the cellular network and may receive the satellite signal, the selection unit 420 is specifically configured to, if the manner in which each first synchronization source selects the synchronization signal is the same, select the target synchronization source according to a third priority order, wherein the third priority order includes: a synchronization source synchronized with both of the cellular network and the satellite system, a synchronization source synchronized with the satellite system, and a synchronization source synchronized with the network equipment in order from high to low.

Optionally, when the synchronization device 400 is out of the coverage of the cellular network and may receive the satellite signal, the selection unit 420 is specifically configured to, if the manner in which the at least one first synchronization source selects the synchronization signal is different, select the target synchronization source according to a fourth priority order, wherein the fourth priority order includes: a synchronization source selecting the synchronization signal according to the first manner and synchronized with both of the network equipment and the satellite system, a synchronization source selecting the synchronization signal according to the second manner and synchronized with both of the network equipment and the satellite system, a synchronization source selecting the synchronization signal according to the second manner and synchronized with the satellite system, and a synchronization source selecting the synchronization signal according to the first manner and synchronized with the network equipment in order from high to low.

Optionally, signal strength of the first synchronization source is higher than or equal to a first threshold value.

Optionally, the synchronization unit 430 is further configured to, when the at least one synchronization source does not include the first synchronization source, perform synchronization with the satellite system.

Optionally, when the synchronization device is out of the coverage of the cellular network and may not receive any satellite signal, the selection unit 420 is specifically configured to determine whether the manner in which the at least one first synchronization signal selects the synchronization signal is the same or not and select the target synchronization source from the at least one first synchronization source according to whether the manner in which the at least one first synchronization source selects the synchronization signal is the same or not.

Optionally, when the synchronization device is out of the coverage of the cellular network and may not receive any satellite signal, the selection unit 420 is specifically configured to, if the manner in which the at least one first synchronization source selects the synchronization signal is the same, select the target synchronization source according to a fifth priority order, wherein the fifth priority order includes: a synchronization source synchronized with both of the network equipment and the satellite system, the synchronization source synchronized with the network equipment, and the synchronization source synchronized with the satellite system from high to low.

Optionally, when the synchronization device is out of the coverage of the cellular network and may not receive any satellite signal, the selection unit 420 is specifically configured to, if the manner in which the at least one first synchronization source selects the synchronization signal is different, select the target synchronization source according to a sixth priority order, wherein the sixth priority order includes: the synchronization source selecting the synchronization signal according to the first manner and synchronized with both of the network equipment and the satellite system, the synchronization source selecting the synchronization signal according to the first manner and synchronized with the network equipment, the synchronization source selecting the synchronization signal according to the second manner and synchronized with both of the network equipment and the satellite system, and the synchronization source selecting the synchronization signal according to the second manner and synchronized with the satellite system from high to low.

Optionally, the signal strength of the first synchronization source is higher than or equal to a second threshold value.

Optionally, the selection unit 420 is further configured to, when the at least one synchronization source does not include the first synchronization source and includes at least one second synchronization source, select the target synchronization source according to a seventh priority order, signal strength of the second synchronization source being lower than the second threshold value and higher than or equal to a third threshold value, wherein the seventh priority order includes: the synchronization source synchronized with the satellite system first and then a synchronization source not synchronized with the satellite system and the network equipment.

Optionally, the satellite system is a GNSS, and the synchronization device is vehicle-mounted equipment.

Optionally, the at least one synchronization source includes at least one of the network equipment, the terminal equipment and the satellite system.

Optionally, the synchronization device 400 may correspond to the synchronization device in the method 300, may realize corresponding functions of the synchronization device and will not be elaborated herein for simplicity.

Figure 5:
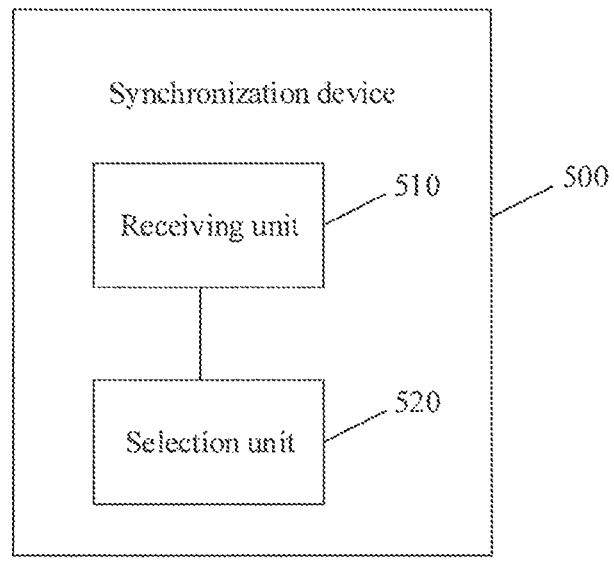
FIG. 5 is a schematic block diagram of a synchronization device according to an embodiment of the application.

FIG. 5 is a schematic block diagram of a synchronization device 500 according to an embodiment of the application. As shown in FIG. 5, the synchronization device 500 includes: a receiving unit 510, configured to receive indication information sent by network equipment, wherein the indication information is configured to indicate a manner in which the synchronization device selects a synchronization source, the manner is a first manner or a second manner or a third manner, the first manner is to select a synchronization signal according to a first priority order, the second manner is to select the synchronization signal according to a second priority order, and the third manner is to select the synchronization signal according to the first priority order and the second priority order, wherein the first priority order is an order of synchronization signals sequenced according to relevance between synchronization signals and a cellular network, and the second priority order is an order of synchronization signals sequenced according to relevance between synchronization signals and a satellite system; and a selection unit 520, configured to select a target synchronization source based on the indication information.

Optionally, the selection unit 520 is specifically configured to, when the indication information indicates the first manner, if the receiving unit may not receive any synchronization signal related to a signal of the cellular network, select, by the selection unit, the target synchronization source according to the second manner; or when the indication information indicates the second manner, if the receiving unit may not receive any synchronization signal related to the satellite system, select, by the selection unit, the target synchronization source according to the first manner.

Optionally, the selection unit 520 is specifically configured to: if the receiving unit may not receive any synchronization signal related to the signal of the cellular network within a first predetermined time, select the target synchronization source according to the second manner; or, if the receiving unit may not receive any synchronization signal related to the satellite system within a second predetermined time, select the target synchronization source according to the first manner.

Optionally, the first priority order includes: a synchronization signal directly from network equipment, a synchronization signal from terminal equipment directly synchronized with the network equipment, and a synchronization signal from terminal equipment indirectly synchronized with the network equipment in order from high to low.

Optionally, the second priority order includes: a synchronization signal generated by the satellite system, a synchronization signal from terminal equipment directly synchronized with the satellite system, and a synchronization signal from terminal equipment indirectly synchronized with the satellite system in order from high to low.

Optionally, in the third manner, priorities of the synchronization signals in the first priority order are higher than priorities of the synchronization signals in the second priority order, or the priorities of the synchronization signals in the second priority order are higher than the priorities of the synchronization signals in the first priority order.

Optionally, the synchronization device 500 may correspond to the synchronization device in the method 200, may realize corresponding functions of the synchronization device and will not be elaborated herein for simplicity.

Figure 6:
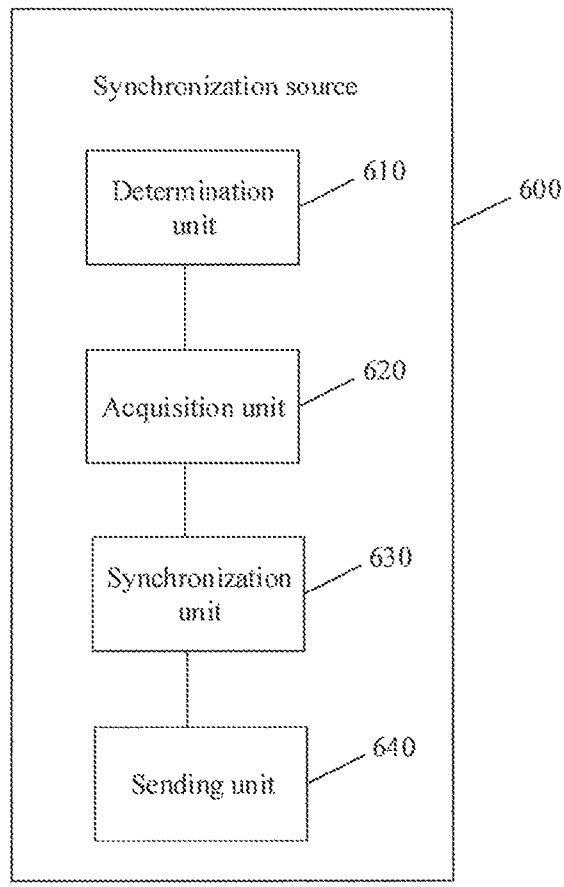
FIG. 6 is a schematic block diagram of a synchronization source according to an embodiment of the application.

FIG. 6 is a schematic block diagram of a synchronization source 600 according to an embodiment of the application. As shown in FIG. 6, the synchronization source 600 includes: a determination unit 610, configured to determine a manner configured for an acquisition unit 620 to acquire a synchronization signal, wherein the manner in which the acquisition unit 620 acquires the synchronization signal includes a first manner or a second manner, the first manner is to select the synchronization signal according to a first priority order, and the second manner is to select the synchronization signal according to a second priority order, wherein the first priority order is an order of synchronization signals sequenced according to relevance between synchronization signals and a cellular network, and the second priority order is an order of synchronization signals sequenced according to relevance between synchronization signals and a satellite system; the acquisition unit 620, configured to acquire a first synchronization signal according to the manner, determined by the determination unit 610, configured to acquire the synchronization signal; a synchronization unit 630, configured to perform synchronization according to the first synchronization signal; and a sending unit 640, configured to send a second synchronization signal and indication information, wherein the indication information is configured to indicate the manner in which the synchronization source acquires the first synchronization signal.

Optionally, the sending unit 640 is specifically configured to: send the second synchronization signal implemented through a first synchronization sequence, and send broadcast information, the broadcast information being configured to indicate the indication information.

Optionally, the synchronization source 600 is equipment directly synchronized with the satellite system, and the first synchronization sequence is a sequence including the second synchronization signal sent by the sending unit 640, or, the synchronization source 600 is equipment indirectly synchronized with the satellite system, and the first synchronization sequence is a sequence including the second synchronization signal sent by the sending unit 640.

Optionally, the sending unit 640 is specifically configured to send a second synchronization sequence, the second synchronization sequence including the second synchronization signal and the indication information.

Optionally, the synchronization source 600 is equipment directly synchronized with the satellite system, and the second synchronization sequence is a sequence including the second synchronization signal sent by the sending unit 640; or the synchronization source 600 is equipment indirectly synchronized with the satellite system, and the second synchronization sequence is a sequence including the second synchronization signal sent by the sending unit 640.

Optionally, the first priority order includes: a synchronization signal directly from network equipment, a synchronization signal from terminal equipment directly synchronized with the network equipment, and a synchronization signal from terminal equipment indirectly synchronized with the satellite system from high to low.

Optionally, the second priority order includes: a synchronization signal generated by the satellite system, a synchronization signal from terminal equipment directly synchronized with the satellite system, and a synchronization signal from terminal equipment indirectly synchronized with the satellite system from high to low.

Optionally, the determination unit 610 is specifically configured to determine the manner configured to acquire the synchronization signal according to indication of the network equipment.

Optionally, the synchronization source 600 may correspond to the synchronization source in the method 100, may realize corresponding functions of the synchronization source and will not be elaborated herein for simplicity.

Figure 7:
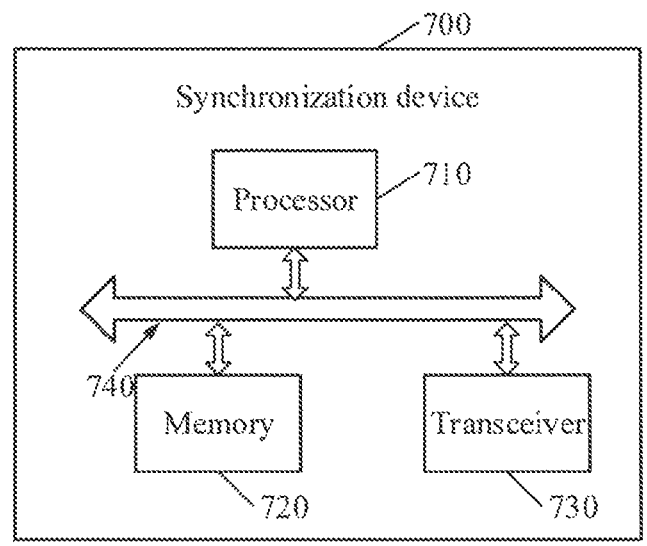
FIG. 7 is a schematic block diagram of a synchronization device according to an embodiment of the application.

FIG. 7 is a schematic block diagram of a synchronization device 700 according to an embodiment of the application. The synchronization device 700 includes a processor 710 and a memory 720. The memory 720 is configured to store a program instruction. The processor 710 may call the program instruction stored in the memory 720. The synchronization device 700 further includes a transceiver 730 configured for external communication and a bus system 740 configured to interconnect the processor 710, the memory 720 and the transceiver 730.

The processor 710 is configured to call the instruction stored in the memory 720 to execute the following operations: determining at least one synchronization source for sending a synchronization signal; when the at least one synchronization source includes at least one first synchronization source, selecting a target synchronization source from the at least one first synchronization source based on a manner in which each first synchronization source selects the synchronization signal, wherein the manner in which the first synchronization source selects the synchronization signal may include a first manner and a second manner, the first manner may be to select the synchronization signal according to a first priority order, and the second manner may be to select the synchronization signal according to a second priority order, wherein the first priority order may be an order of synchronization signals sequenced according to relevance between synchronization signals and a cellular network, and the second priority order may be an order of synchronization signals sequenced according to relevance between synchronization signals and a satellite system; and performing synchronization with the target synchronization source.

Optionally, the first priority order includes: a synchronization signal directly from network equipment, a synchronization signal from terminal equipment directly synchronized with the network equipment, and a synchronization signal from terminal equipment indirectly synchronized with the network equipment from high to low.

Optionally, the second priority order includes: a synchronization signal directly from the satellite system, a synchronization signal from terminal equipment directly synchronized with the satellite system, and a synchronization signal from terminal equipment indirectly synchronized with the satellite system from high to low.

Optionally, a first synchronization sequence includes the synchronization signal from the terminal equipment directly synchronized with the satellite system, wherein the first synchronization sequence is further configured to indicate that terminal equipment for sending the first synchronization sequence is directly synchronized with the satellite system, or, the terminal equipment for sending the first synchronization sequence indicates through a broadcast signal that it is directly synchronized with the satellite system; and/or, a second synchronization sequence includes the synchronization signal from the terminal equipment indirectly synchronized with the satellite system, wherein the second synchronization sequence is further configured to indicate that terminal equipment for sending the second synchronization sequence is indirectly synchronized with the satellite system, or, the terminal equipment for sending the second synchronization sequence indicates through a broadcast signal that it is indirectly synchronized with the satellite system.

Optionally, when the synchronization device 700 is out of coverage of the cellular network and may receive a satellite signal, the processor 710 is configured to call the instruction stored in the memory 720 to execute the following operations: determining whether the manner in which the at least one first synchronization source selects the synchronization signal is the same or not, and selecting the target synchronization source from the at least one first synchronization source according to whether the manner in which the at least one first synchronization source selects the synchronization signal is the same or not.

Optionally, when the synchronization device 700 is out of the coverage of the cellular network and may receive the satellite signal, the processor 710 is configured to call the instruction stored in the memory 720 to execute the following operation: if the manner in which each first synchronization source selects the synchronization signal is the same, selecting, by the synchronization device, the target synchronization source according to a third priority order, wherein the third priority order includes: a synchronization source synchronized with both of the cellular network and the satellite system, a synchronization source synchronized with the satellite system, and a synchronization source synchronized with the network equipment from high to low.

Optionally, when the synchronization device 700 is out of the coverage of the cellular network and may receive the satellite signal, the processor 710 is configured to call the instruction stored in the memory 720 to execute the following operation: if the manner in which the at least one first synchronization source selects the synchronization signal is different, selecting, by the synchronization device, the target synchronization source according to a fourth priority order, wherein the fourth priority order includes: a synchronization source selecting the synchronization signal according to the first manner and synchronized with both of the network equipment and the satellite system, a synchronization source selecting the synchronization signal according to the second manner and synchronized with both of the network equipment and the satellite system, a synchronization source selecting the synchronization signal according to the second manner and synchronized with the satellite system, and a synchronization source selecting the synchronization signal according to the first manner and synchronized with the network equipment from high to low.

Optionally, signal strength of the first synchronization source is higher than or equal to a first threshold value.

Optionally, the processor 710 is configured to call the instruction stored in the memory 720 to execute the following operation: when the at least one synchronization source does not include the first synchronization source, performing synchronization with the satellite system.

Optionally, when the synchronization device is out of the coverage of the cellular network and may not receive any satellite signal, the processor 710 is configured to call the instruction stored in the memory 720 to execute the following operations: determining whether the manner in which the at least one first synchronization signal selects the synchronization signal is the same or not; and selecting the target synchronization source from the at least one first synchronization source according to whether the manner in which the at least one first synchronization source selects the synchronization signal is the same or not.

Optionally, when the synchronization device is out of the coverage of the cellular network and may not receive any satellite signal, the processor 710 is configured to call the instruction stored in the memory 720 to execute the following operation: if the manner in which the at least one first synchronization source selects the synchronization signal is the same, selecting, by the synchronization device, the target synchronization source according to a fifth priority order, wherein the fifth priority order includes: a synchronization source synchronized with both of the network equipment and the satellite system, the synchronization source synchronized with the network equipment, and the synchronization source synchronized with the satellite system from high to low.

Optionally, when the synchronization device is out of the coverage of the cellular network and may not receive any satellite signal, the processor 710 is configured to call the instruction stored in the memory 720 to execute the following operation: if the manner in which the at least one first synchronization source selects the synchronization signal is different, selecting, by the synchronization device, the target synchronization source according to a sixth priority order, wherein the sixth priority order includes: the synchronization source selecting the synchronization signal according to the first manner and synchronized with both of the network equipment and the satellite system, the synchronization source selecting the synchronization signal according to the first manner and synchronized with the network equipment, the synchronization source selecting the synchronization signal according to the second manner and synchronized with both of the network equipment and the satellite system, and the synchronization source selecting the synchronization signal according to the second manner and synchronized with the satellite system from high to low.

Optionally, the signal strength of the first synchronization source is higher than or equal to a second threshold value.

Optionally, the processor 710 is configured to call the instruction stored in the memory 720 to execute the following operation: when the at least one synchronization source does not include the first synchronization source and includes at least one second synchronization source, selecting the target synchronization source according to a seventh priority order, signal strength of the second synchronization source being lower than the second threshold value and higher than or equal to a third threshold value, wherein the seventh priority order includes: the synchronization source synchronized with the satellite system first, and then a synchronization source not synchronized with the satellite system and the network equipment.

Optionally, the satellite system is a GNSS, and the synchronization device is vehicle-mounted equipment.

Optionally, the at least one synchronization source includes at least one of the network equipment, the terminal equipment and the satellite system.

Optionally, the synchronization device 700 may correspond to the synchronization device in the method 300, may realize corresponding functions of the synchronization device and will not be elaborated herein for simplicity.

Figure 8:
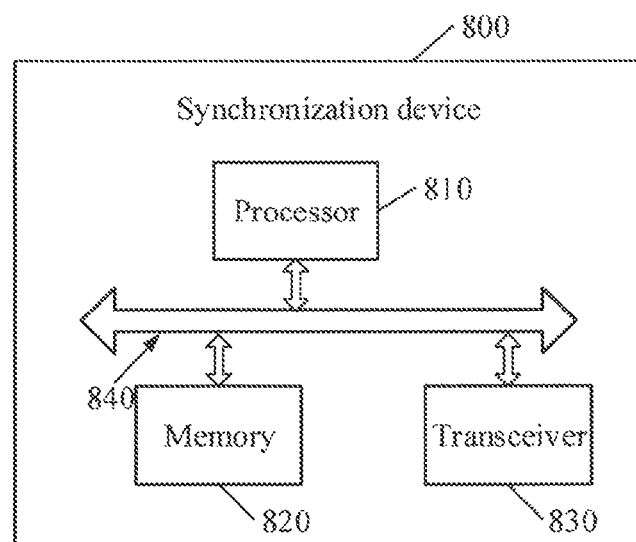
FIG. 8 is a schematic block diagram of a synchronization device according to an embodiment of the application.

FIG. 8 is a schematic block diagram of a synchronization device 800 according to an embodiment of the application. The synchronization device 800 includes a processor 810 and a memory 820. The memory 820 is configured to store a program instruction. The processor 810 may call the program instruction stored in the memory 820. The synchronization device 800 further includes a transceiver 830 configured for external communication and a bus system 840 configured to interconnect the processor 810, the memory 820 and the transceiver 830.

The processor 810 is configured to call the instruction stored in the memory 820 to execute the following operations: utilizing the transceiver 830 to receive indication information sent by network equipment, wherein the indication information is configured to indicate a manner in which the synchronization device selects a synchronization source, the manner is a first manner or a second manner or a third manner, the first manner is to select a synchronization signal according to a first priority order, the second manner is to select the synchronization signal according to a second priority order, and the third manner is to select the synchronization signal according to the first priority order and the second priority order, wherein the first priority order is an order of synchronization signals sequenced according to relevance between synchronization signals and a cellular network, and the second priority order is an order of synchronization signals sequenced according to relevance between synchronization signals and a satellite system; and selecting a target synchronization source based on the indication information.

Optionally, the processor 810 is configured to call the instruction stored in the memory 820 to execute the following operations: when the indication information indicates the first manner, if the transceiver 830 may not receive any synchronization signal related to a signal of the cellular network, selecting the target synchronization source according to the second manner; or when the indication information indicates the second manner, if the transceiver 830 may not receive any synchronization signal related to the satellite system, selecting the target synchronization source according to the first manner.

Optionally, the processor 810 is configured to call the instruction stored in the memory 820 to execute the following operations: if the transceiver 830 may not receive any synchronization signal related to the signal of the cellular network within a first predetermined time, selecting the target synchronization source according to the second manner; or, if the transceiver 830 may not receive any synchronization signal related to the satellite system within a second predetermined time, selecting the target synchronization source according to the first manner.

Optionally, the first priority order includes: a synchronization signal directly from network equipment, a synchronization signal from terminal equipment directly synchronized with the network equipment, and a synchronization signal from terminal equipment indirectly synchronized with the network equipment from high to low.

Optionally, the second priority order includes: a synchronization signal generated by the satellite system, a synchronization signal from terminal equipment directly synchronized with the satellite system, and a synchronization signal from terminal equipment indirectly synchronized with the satellite system from high to low.

Optionally, in the third manner, priorities of the synchronization signals in the first priority order are higher than priorities of the synchronization signals in the second priority order, or the priorities of the synchronization signals in the second priority order are higher than the priorities of the synchronization signals in the first priority order.

Optionally, the synchronization device 800 may correspond to the synchronization device in the method 200, may realize corresponding functions of the synchronization device and will not be elaborated herein for simplicity.

Figure 9:
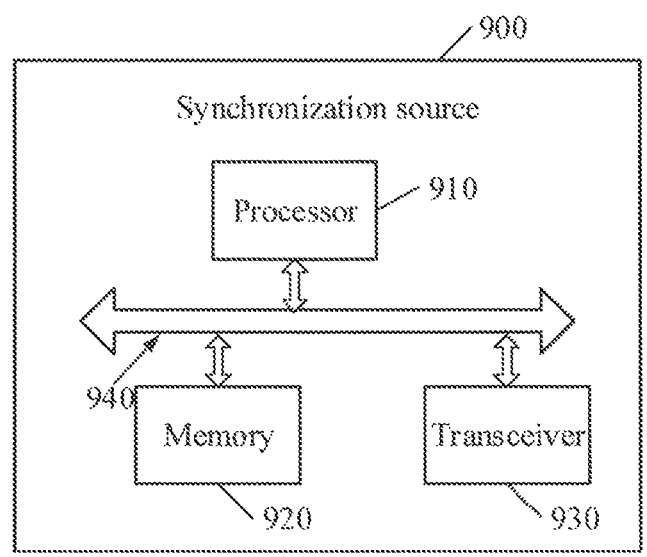
FIG. 9 is a schematic block diagram of a synchronization source according to an embodiment of the application.

FIG. 9 is a schematic block diagram of a synchronization source 900 according to an embodiment of the application. The synchronization source 900 includes a processor 910 and a memory 920. The memory 920 is configured to store a program instruction. The processor 910 is configured to call the program instruction stored in the memory 920. The synchronization source 900 further includes a transceiver 930 configured for external communication and a bus system 940 configured to interconnect the processor 910, the memory 920 and the transceiver 930.

The processor 910 is configured to call the instruction stored in the memory 920 to execute the following operations: determining a manner configured to acquire a synchronization signal, wherein the manner for acquiring the synchronization signal includes a first manner or a second manner, the first manner is to select the synchronization signal according to a first priority order, and the second manner is to select the synchronization signal according to a second priority order, wherein the first priority order is an order of synchronization signals sequenced according to relevance between synchronization signals and a cellular network, and the second priority order is an order of synchronization signals sequenced according to relevance between synchronization signals and a satellite system; acquiring a first synchronization signal according to the determined manner configured to acquire the synchronization signal; performing synchronization according to the first synchronization signal; and sending a second synchronization signal and indication information, wherein the indication information is configured to indicate the manner in which the synchronization source acquires the first synchronization signal.

Optionally, the processor 910 is configured to call the instruction stored in the memory 920 to execute the following operations: sending, through the transceiver 930, the second synchronization signal implemented through a first synchronization sequence; and sending, through the transceiver 930, broadcast information, the broadcast information being configured to indicate the indication information.

Optionally, the synchronization source is equipment directly synchronized with the satellite system, and the first synchronization sequence is a sequence including the second synchronization signal sent by the transceiver 930; or, the synchronization source is equipment indirectly synchronized with the satellite system, and the first synchronization sequence is a sequence including the second synchronization signal sent by the transceiver 930.

Optionally, the processor 910 is configured to call the instruction stored in the memory 920 to execute the following operation: sending, through the transceiver 930, a second synchronization sequence, the second synchronization sequence including the second synchronization signal and the indication information.

Optionally, the synchronization source is equipment directly synchronized with the satellite system, and the second synchronization sequence is a sequence including the second synchronization signal sent by the transceiver 930; or the synchronization source is equipment indirectly synchronized with the satellite system, and the second synchronization sequence is a sequence including the second synchronization signal sent by the transceiver 930.

Optionally, the first priority order includes: a synchronization signal directly from network equipment, a synchronization signal from terminal equipment directly synchronized with the network equipment, and a synchronization signal from terminal equipment indirectly synchronized with the satellite system from high to low.

Optionally, the second priority order includes: a synchronization signal generated by the satellite system, a synchronization signal from terminal equipment directly synchronized with the satellite system, and a synchronization signal from terminal equipment indirectly synchronized with the satellite system from high to low.

Optionally, the processor 910 is configured to call the instruction stored in the memory 920 to execute the following operation: determining, by the synchronization source, the manner configured to acquire the synchronization signal according to indication of the network equipment.

Optionally, the synchronization source 900 may correspond to the synchronization source in the method 100, may realize corresponding functions of the synchronization source and will not be elaborated herein for simplicity.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fail within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the application. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A synchronization method, comprising:
   determining, by a synchronization device, a plurality of synchronization sources for sending synchronization signals;
   when the plurality of synchronization sources comprise a plurality of first synchronization sources, determining, by the synchronization device, whether manners in which all of the first synchronization sources select the synchronization signals are a same manner, and selecting, by the synchronization device, a target synchronization source from the plurality of first synchronization sources based on whether the manners in which all of the first synchronization sources select the synchronization signals are the same manner, wherein the manners in which the first synchronization sources select the synchronization signals comprise a first manner and a second manner, in which the first manner is to select the synchronization signals according to a first priority order, and the second manner is to select the synchronization signals according to a second priority order, the first priority order is an order of the synchronization signals sequenced according to relevance between the synchronization signals and a cellular network, and the second priority order is an order of the synchronization signals sequenced according to relevance between the synchronization signals and a satellite system; and performing, by the synchronization device, synchronization with the target synchronization source, wherein when the synchronization device is out of coverage of the cellular network and is able to receive a satellite signal, the method further comprises:

when the manners in which all of the first synchronization sources select the synchronization signals are a same manner, selecting the target synchronization source according to a third priority order, the third priority order comprising a descending order of: a synchronization source synchronized with both of the cellular network and the satellite system, a synchronization source synchronized with the satellite system, and a synchronization source synchronized with the network equipment; and when the manners in which the plurality of first synchronization sources select the synchronization signals are different manners, selecting the target synchronization source according to a fourth priority order, the fourth priority order comprising a descending order of: a synchronization source selecting the synchronization signal according to the first manner and synchronized with both of the network equipment and the satellite system, a synchronization source selecting the synchronization signal according to the second manner and synchronized with both of the network equipment and the satellite system, a synchronization source selecting the synchronization signal according to the second manner and synchronized with the satellite system, and a synchronization source selecting the synchronization signal according to the first manner and synchronized with the network equipment, and wherein when the synchronization device is out of the coverage of the cellular network and is not able to receive any satellite signal, the method further comprises:

when the manners in which all of the first synchronization sources select the synchronization signals are the same manner, selecting the target synchronization source according to a fifth priority order, the fifth priority order comprising a descending order of: a synchronization source synchronized with both of the network equipment and the satellite system, the synchronization source synchronized with the network equipment, and the synchronization source synchronized with the satellite system; and when the manners in which the plurality of first synchronization sources select the synchronization signals are different manners, selecting the target synchronization source according to a sixth priority order, the sixth priority order comprising a descending order of: the synchronization source selecting the synchronization signal according to the first manner and synchronized with both of the network equipment and the satellite system, the synchronization source selecting the synchronization signal according to the first manner and synchronized with the network equipment, the synchronization source selecting the synchronization signal according to the second manner and synchronized with both of the network equipment and the satellite system, and the synchronization source selecting the synchronization signal according to the second manner and synchronized with both of the network equipment and the satellite system, and the synchronization source selecting the synchronization signal according to the second manner and synchronized with the satellite system.

2. A synchronization device, comprising:

a processor;

a memory configured to store a program instruction; and wherein the processor is configured to execute the program instruction stored in the memory to:

determine a plurality of synchronization sources for sending synchronization signals;

when the plurality of synchronization sources comprise a plurality of first synchronization sources, determine whether manners in which all of the first synchronization sources select the synchronization signals are a same manner, and select a target synchronization source from the plurality of first synchronization sources based on whether the manners in which all of the first synchronization sources select the synchronization signals are the same manner, wherein the manners in which the first synchronization sources select the synchronization signals comprise a first manner and a second manner, in which the first manner is to select the synchronization signals according to a first priority order, and the second manner is to select the synchronization signals according to a second priority order, wherein the first priority order is an order of the synchronization signals sequenced according to relevance between the synchronization signals and a cellular network, and the second priority order is an order of the synchronization signals sequenced according to relevance between the synchronization signals and a satellite system; and perform synchronization with the target synchronization source, wherein when the synchronization device is out of coverage of the cellular network and is able to receive a satellite signal, the processor is further configured to execute the program instruction stored in the memory to:

when the manners in which all of the first synchronization sources select the synchronization signals are a same manner, select the target synchronization source according to a third priority order, the third priority order comprising a descending order of: a synchronization source synchronized with both of the cellular network and the satellite system, a synchronization source synchronized with the satellite system, and a synchronization source synchronized with the network equipment; and when the manners in which the plurality of first synchronization sources select the synchronization signals are different manners, select the target synchronization source according to a fourth priority order, the fourth priority order comprising a descending order of: a synchronization source selecting the synchronization signal according to the first manner and synchronized with both of the network equipment and the satellite system, a synchronization source selecting the synchronization signal according to the second manner and synchronized with both of the network equipment and the satellite system, a synchronization source selecting the synchronization signal according to the second manner and synchronized with the satellite system, and a synchronization source selecting the synchronization signal according to the first manner and synchronized with the network equipment, and wherein when the synchronization device is out of the coverage of the cellular network and is not able to receive any satellite signal, the processor is further configured to execute the program instruction stored in the memory to:

when the manners in which all of the first synchronization sources select the synchronization signals are the same manner, select the target synchronization source according to a fifth priority order, the fifth priority order comprising a descending order of: a synchronization source synchronized with both of the network equipment and the satellite system, the synchronization source synchronized with the network equipment, and the synchronization source synchronized with the satellite system; and when the manners in which the plurality of first synchronization sources select the synchronization signals are different manners, select the target synchronization source according to a sixth priority order, the sixth priority order comprising a descending order of: the synchronization source selecting the synchronization signal according to the first manner and synchronized with both of the network equipment and the satellite system, the synchronization source selecting the synchronization signal according to the first manner and synchronized with the network equipment, the synchronization source selecting the synchronization signal according to the second manner and synchronized with both of the network equipment and the satellite system, and the synchronization source selecting the synchronization signal according to the second manner and synchronized with the satellite system.

3. The synchronization device according to claim 2, wherein the first priority order comprises a descending order of:

a synchronization signal directly from network equipment, a synchronization signal from terminal equipment directly synchronized with the network equipment, and a synchronization signal from terminal equipment indirectly synchronized with the network equipment.

4. The synchronization device according to claim 2, wherein the second priority order comprises a descending order of:

a synchronization signal directly from the satellite system, a synchronization signal from terminal equipment directly synchronized with the satellite system, and a synchronization signal from terminal equipment indirectly synchronized with the satellite system.

5. The synchronization device according to claim 4, wherein a first synchronization sequence comprises the synchronization signal from the terminal equipment directly synchronized with the satellite system, wherein the first synchronization sequence is further configured to indicate that terminal equipment for sending the first synchronization sequence is directly synchronized with the satellite system, or, the terminal equipment for sending the first synchronization sequence indicates through a broadcast signal that it is directly synchronized with the satellite system; and/or, a second synchronization sequence comprises the synchronization signal from the terminal equipment indirectly synchronized with the satellite system, wherein the second synchronization sequence is further configured to indicate that terminal equipment for sending the second synchronization sequence is indirectly synchronized with the satellite system, or, the terminal equipment for sending the second synchronization sequence indicates through a broadcast signal that it is indirectly synchronized with the satellite system.

6. The synchronization device according to claim 2, wherein signal strength of each first synchronization source is higher than or equal to a first threshold value.

7. The synchronization device according to claim 6, wherein the processor is further configured to call the program instruction stored in the memory to:

when the plurality of synchronization sources fail to comprise a first synchronization source, perform synchronization with the satellite system.

8. The synchronization device according to claim 2, wherein signal strength of each first synchronization source is higher than or equal to a second threshold value.

9. The synchronization device according to claim 8, wherein the processor is further configured to execute the program instruction stored in the memory to:

when the plurality of synchronization sources fail to comprise a first synchronization source and comprise at least one second synchronization source, select the target synchronization source according to a seventh priority order, signal strength of the second synchronization source being lower than the second threshold value and higher than or equal to a third threshold value, wherein the seventh priority order comprises a descending order of:

the synchronization source synchronized with the satellite system, a synchronization source not synchronized with both the satellite system and the network equipment.

10. The synchronization device according to claim 2, wherein the satellite system is a Global Navigation Satellite System (GNSS), and the synchronization device is vehicle-mounted equipment.

11. The synchronization device according to claim 2, wherein the plurality of synchronization sources comprise at least one of the network equipment, the terminal equipment or the satellite system.

\* \* \* \* \*